United States Patent [19]

Horiya et al.

[11] Patent Number: 4,524,367
[45] Date of Patent: Jun. 18, 1985

[54] THERMAL PRINTER

[75] Inventors: Keiichi Horiya, Numazu; Naoki Miyazaki, Shizuoka, both of Japan

[73] Assignee: Tokyo Electric Co., Ltd., Tokyo, Japan

[21] Appl. No.: 558,942

[22] Filed: Dec. 7, 1983

[30] Foreign Application Priority Data

Dec. 23, 1982 [JP] Japan ................. 57-231507
Dec. 23, 1982 [JP] Japan ................. 57-231508

[51] Int. Cl.³ ............................ G06F 15/70
[52] U.S. Cl. ..................... 346/76 PH; 358/77; 358/287; 358/288
[58] Field of Search .......... 358/77, 287, 288, 283, 358/284, 298, 296, 180; 346/76, 76 PH; 400/120; 219/216, 216 PH

[56] References Cited

U.S. PATENT DOCUMENTS 4,450,453  5/1984  Kitamura et al. .......... 346/108
4,484,347  11/1984  Kushioka et al. .......... 358/287

FOREIGN PATENT DOCUMENTS 0027734  4/1981  European Pat. Off.
2302860  3/1976  France.
2059655  4/1981  United Kingdom.
2086628  5/1982  United Kingdom.

OTHER PUBLICATIONS

IBM Technical Disclosure Bulletin, vol. 21, 1979, p. 4892.
IBM Technical Disclosure Bulletin, vol. 18, 1976, p. 3344.

Primary Examiner—E. A. Goldberg
Assistant Examiner—A. Evans
Attorney, Agent, or Firm—Frishauf, Holtz, Goodman & Woodward

[57] ABSTRACT

A thermal printer includes a CPU which reads out a corresponding character data from an ROM in accordance with a character specifying data from a host computer and selectively allows currents to flow through thermal resistors of a thermal head in accordance with the n-bit dot pattern data which constitutes the readout character data. A size data representative of the size of the picture element of the character to be printed is further generated from the host computer. The CPU converts the n-bit dot pattern data into the dot pattern data of the number of bits designated by the size data and selectively allows the currents to flow through the thermal resistors in accordance with this converted dot pattern data.

10 Claims, 36 Drawing Figures

THERMAL PRINTER

BACKGROUND OF THE INVENTION

The present invention relates to a thermal printer and a thermal printing method.

Conventionally, thermal printers of the high density type and high speed type are known. A print head of such a thermal printer of this high density type has a plurality of heating elements each of which has a printing surface of small area and which are arranged in a line with a narrow dot distance. The head is driven step by step in a direction of the printing line in the short cycle corresponding to the narrow dot distance in the printing operation, and the current pulses are supplied to the selected heating elements in accordance with the data to be printed, thereby printing the dot pattern with high density on a thermal recording paper or on a recording paper through the ribbon on which a thermally melting ink was coated, However, in this case, it is required to execute a number of printing cycles to print the dot data of one line, so that the print speed will become slow. Furthermore, in the high speed thermal printer, the printing surface of each heating element has a larger area than that of the thermal printer of the high density type and the heating elements are arranged with a larger dot distance. In the printing operation, the head is step-driven in the cycle corresponding to the large dot distance, and at the same time the current pulses are supplied to the selected heating elements, thereby printing the dot pattern at high speed. In this case, the density of the picture element becomes low since the number of dots which constitute the dot pattern of one line is small.

Since the dimensions of the heating elements to be used in the thermal printers of the high density and high speed types are mutually different, in order to constitute the thermal printer which can selectively execute the high density and high speed printing operations, it is considered to be needed to use a special print head having two kinds of heating elements for use of, e.g., the high density and high speed printing operations.

Moreover, conventionally, there has been proposed such a thermal printer that can change the dot space in the printing direction or line direction by changing the rotating speed of a carriage drive motor in order to change the size of the character to be printed. However, in the thermal printer of this kind, an unnatural character pattern may be printed since only the transverse width of the character to be printed can be changed.

SUMMARY OF THE INVENTION

It is an object of the present invention to provide a thermal printer which can change the vertical and lateral dimensions of the picture element by changing the number of dots which constitute each print picture element.

Another object of the present invention is to provide a printing method by a thermal printer which can print the same character data in the form of different printing patterns by changing the vertical and lateral dimensions of a print picture element.

These objects are accomplished by a thermal printer comprising: a data generator for generating character specifying data to specify the character to be printed and size data representative of the size of the picture element of this character; a thermal head having a plurality of heating elements arranged in a line; a head drive unit for driving this thermal head in the printing direction at a speed corresponding to a drive signal; a head control unit for selectively supplying currents to the plurality of heating elements in response to a dot pattern data; a memory storing a plurality of character data which are each constituted by m dot pattern data each having n bits; and a controller which fetches the character data specified by the character specifying data read out from this memory, converts the n-bit dot pattern data of this fetched character data into the dot pattern data of the number of bits specified by the above-mentioned size data and thereafter supplies the converted dot pattern data to the head control unit, and which produces a drive signal corresponding to the size data to the head drive unit.

In the present invention, since the picture element size is determined in dependence upon the size data from the data generator, it is possible to print the same character in the form of different patterns or sizes by using the same heating elements.

DETAILED DESCRIPTION OF THE PREFERRED EMBODIMENTS

Figure 1:
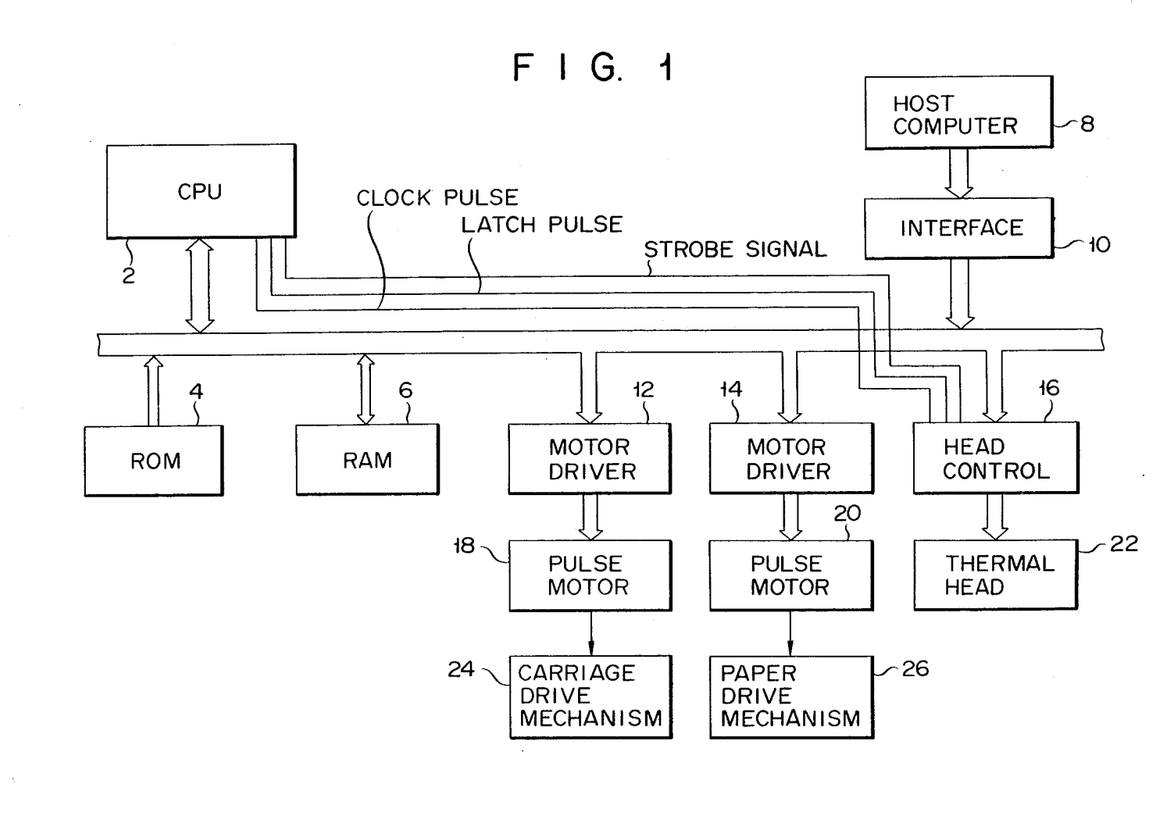
FIG. 1 is a block diagram of a thermal printer according to one embodiment of the present invention.

FIG. 1 is a block diagram of a thermal printer according to one embodiment of the present invention. This thermal printer includes a central processing unit (CPU) 2 to which a read only memory (ROM) 4 and a random access memory (RAM) 6 are coupled through a data bus, and a host computer 8 coupled to the CPU 2 through an interface circuit 10 and the data bus.

Furthermore, motor drivers 12 and 14 and a head control 16 are coupled to the CPU 2 through the data bus. Pulse motors 18 and 20 and a thermal head 22 are connected to these motor drivers 12 and 14 and head control 16, respectively. The pulse motors 18 and 20 are coupled to supply drive pulses to a carriage drive mechanism 24 and a paper feed mechanism 26 for driving a carriage and a recording paper (not shown), respectively.

Figure 2:
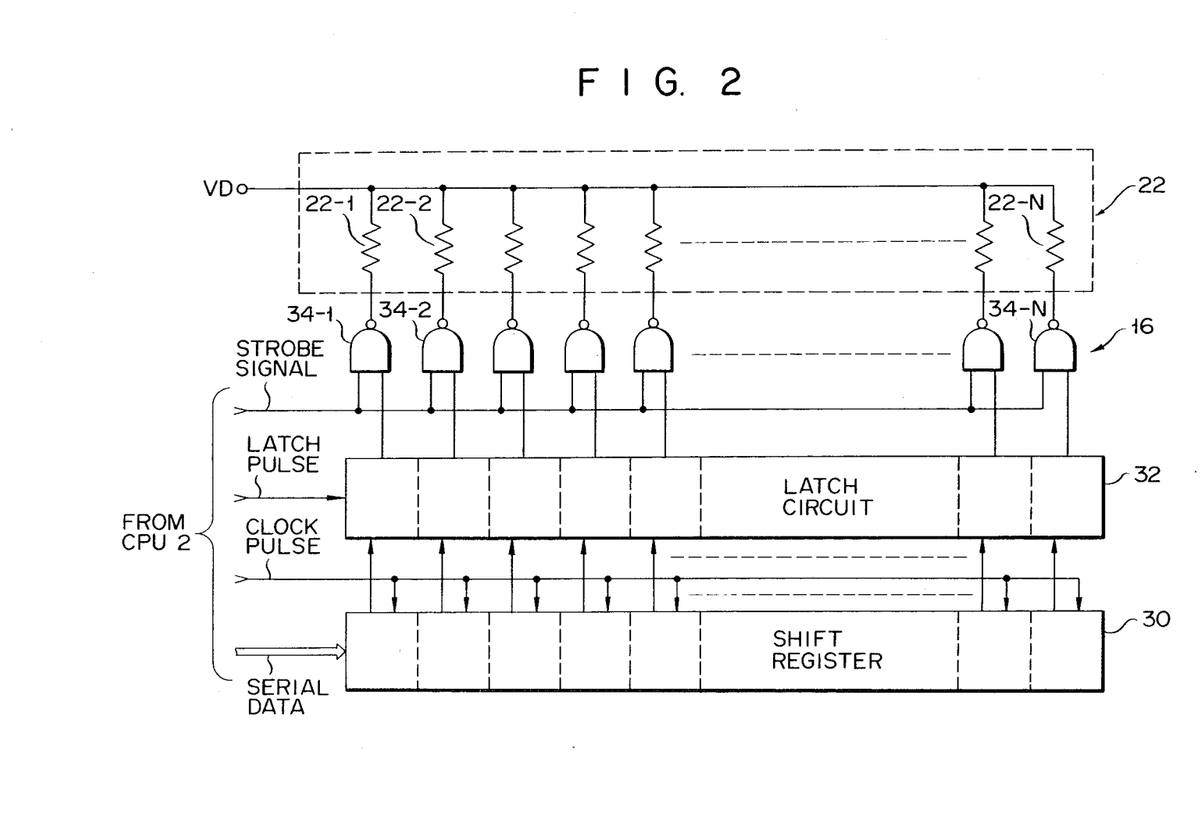
FIG. 2 is a diagram showing in detail a thermal head and a head control of the thermal printer shown in FIG. 1.

FIG. 2 shows the detail of the head control 16 and thermal head 22 shown in FIG. 1. This head control 16 includes a shift register 30 of, e.g. N stages to sequentially shift the serial data from the CPU 2, a latch circuit 32 to latch the parallel output data from this shift register 30, and N NAND gates 34-1 to 34-N, which are each connected to receive at one input terminal the N parallel output bits from this latch circuit 32 and receive at the other input terminals the strobe signal from the CPU 2. The thermal head 22 includes N resistors 22-1 to 22-N each having one end connected to the power supply terminal VD and the other end connected to the output terminal of a corresponding one of the NAND gates 34-1 to 34-N.

Figures 3, 4:
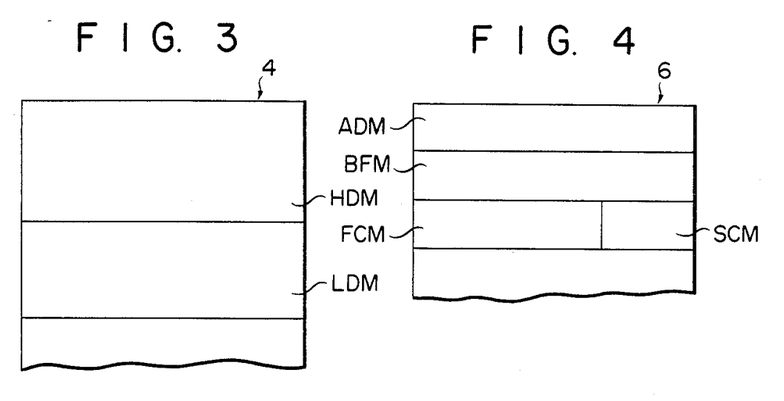
FIGS. 3 and 4 show memory maps of a read only memory and a random access memory used in the thermal printer shown in FIG. 1, respectively.

As shown in FIG. 3, the ROM 4 shown in FIG. 1 includes a memory area HDM to store a plurality of high density character data representing a plurality of characters which are each constituted by 24 dots×19 columns, and a memory area LDM to store a plurality of low density character data representing a plurality of characters which are each constituted by 8 dots×9 columns, for example. As shown in FIG. 4, the RAM 6 includes an address memory area ADM to store address data corresponding to the character specifying data to specify the character to be printed from the host computer 8, a buffer memory area BFM to temporarily store the character data read out from the ROM 4 and first and second condition memory areas FCM and SCM to store the first and second condition data corresponding to the height data and width data representative of a height and a width of the character to be printed from the host computer 8.

Figure 5A:
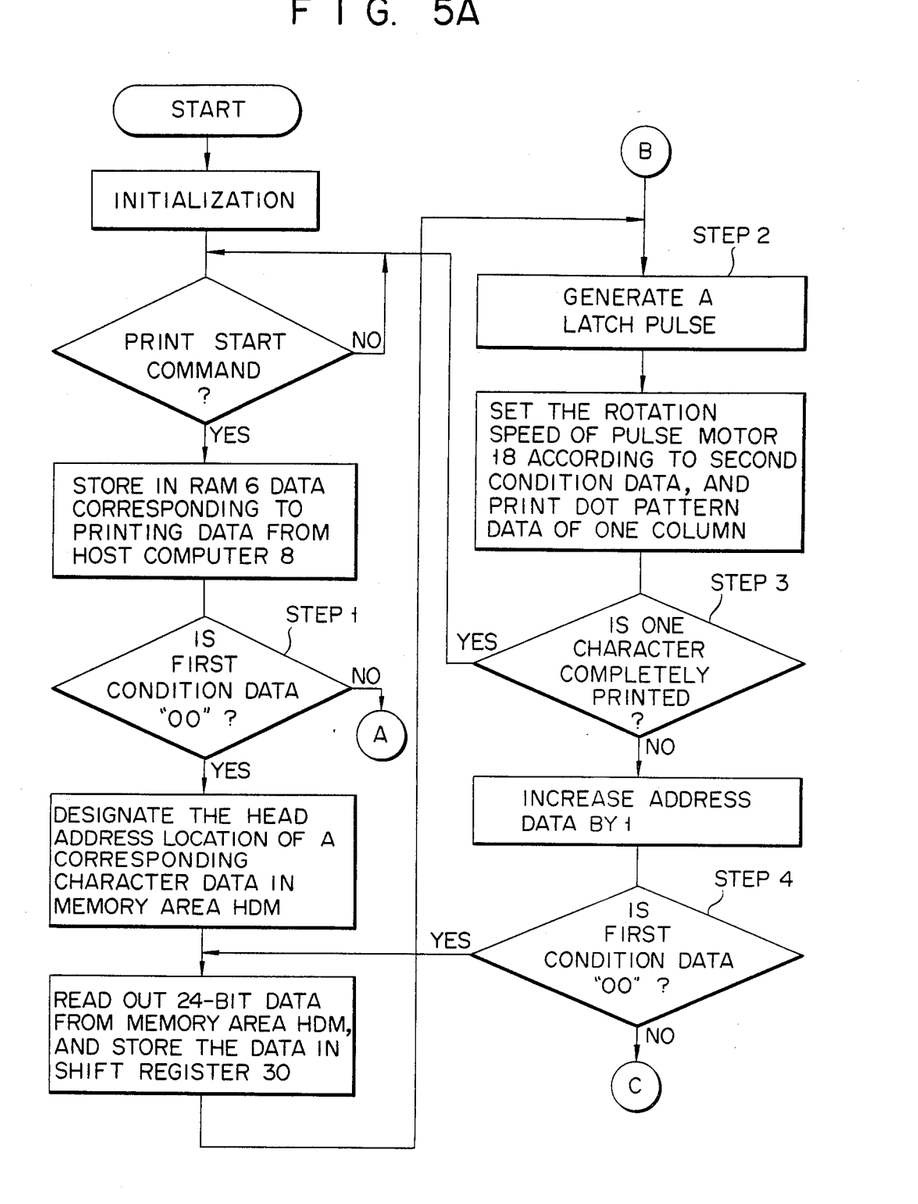
FIGS. 5A and 5B show flowcharts to describe the operation of the thermal printer shown in FIGS. 1 to 4.
Figure 5B:
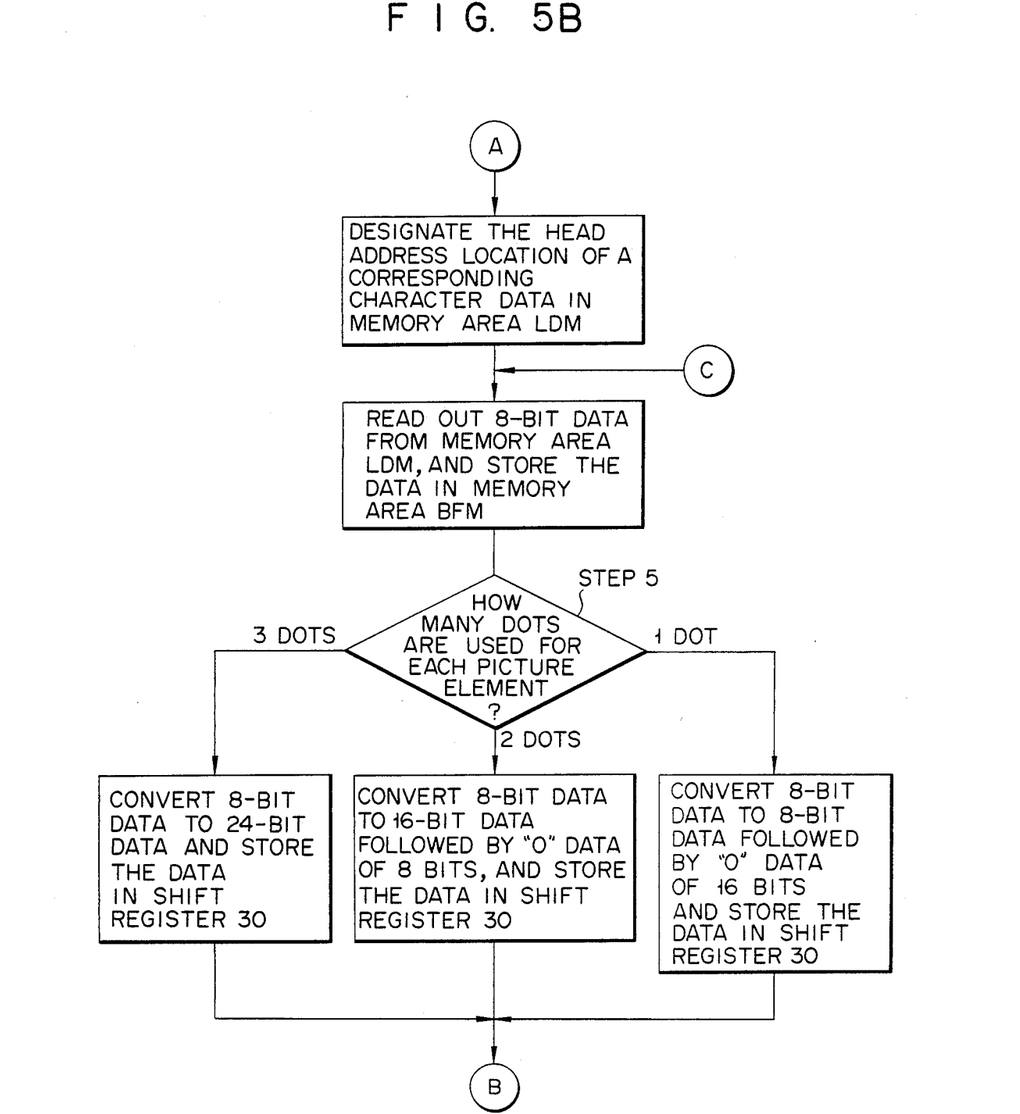

The operation of the thermal printer shown in FIGS. 1 to 4 will be described hereinbelow with reference to the flowcharts shown in FIGS. 5A and 5B. In this embodiment, it is assumed that N=24.

Figure 6A:
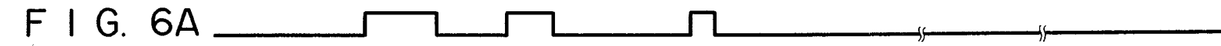
FIGS. 6A to 6D are signal waveform diagrams to illustrate the operation of the thermal printer shown in FIGS. 1 to 4 in the high density printing mode.
Figure 6B:
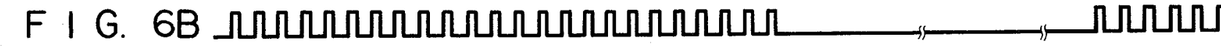
Figure 6C:
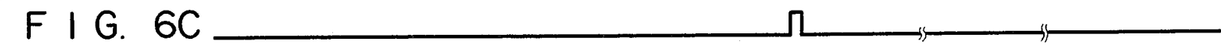
Figure 6D:
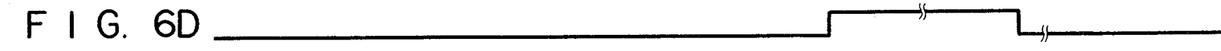

After completion of the initialization step, the CPU 2 checks to see whether the print start command signal is generated from the host computer 8 or not. This print start command signal is generated from the host computer 8 when all of the data necessary for the printing operation, for example, character specifying data, height data and width data have been prepared. The CPU 2 writes the address data corresponding to the character specifying data from this host computer 8 in the address memory area ADM of the RAM 6 in response to the print start command signal from the host computer 8, and at the same time it stores the first and second condition data corresponding to the height and width data in the first and second memory areas FCM and SCM in the RAM 6. The CPU 2 then checks in STEP 1 whether the character data is printed with high density or not on the basis of the first condition data in the RAM 6. In this STEP 1, when it is detected that the character data is printed with high density, i.e., that the first condition data is "0 0", the CPU 2 designates the head address of the corresponding character data stored in the high density character memory area HDM on the basis of the address data stored in the address memory area ADM in the RAM 6; reads out the dot pattern data of one column, i.e., of 24 bits; then stores in the buffer memory area BFM in the RAM 6. Thereafter the CPU 2 allows the dot pattern data to be generated bit by bit as shown in FIG. 6A from this buffer memory area BFM each time one clock pulse shown in FIG. 6B is generated. The shift register 30 takes the dot pattern data supplied from the buffer memory area BFM bit by bit in response to the clock pulse shown in FIG. 6B and sequentially shifts them. In this way, when all of the 24 clock pulses are supplied to the shift register 30 and the dot pattern data of one column stored in the buffer memory area BFM is all stored in the shift register 30, the CPU 2 generates a latch pulse shown in FIG. 6C to the latch circuit 32 in STEP 2, thereby transferring the 24-bit pattern data stored in the shift register 30 to this latch circuit 32. The CPU 2 then sets the rotating speed of the pulse motor 18 in accordance with the second condition data in the memory area SCM in the RAM 6. Since the second condition data is "0" in the high density printing mode, the CPU 2 sends a first drive signal to the motor driver 12 for allowing the pulse motor 18 to rotate at a rotating speed of V, thereby driving the carriage at a constant speed in the printing direction. Thereafter, the CPU 2 supplies a strobe signal shown in FIG. 6D to the NAND gates 34-1 to 34-N during a predetermined interval. Due to this, currents are selectively allowed to flow through the thermal resistors 22-1 to 22-N in accordance with the content of the bit pattern data in the lach circuit 32. Thus, for example, the thermal melting ink at the corresponding portions of the ink ribbon are melted and adhered on the recording paper. In this case, the height of each picture element of the character pattern to be printed is determined by the height of each of the thermal resistors 22-1 to 22-N and the width is determined by the high level period of the strobe signal and the rotating speed of the pulse motor 18. In this case, since the high level period of the strobe signal has been set to be constant, the width of each picture element is substantially determined by the rotating speed of the pulse motor 18.

Figures 7A, 7B:
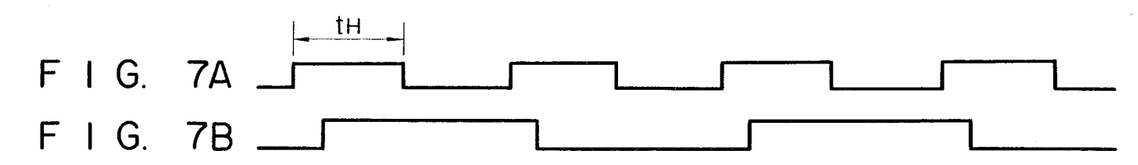
FIGS. 7A to 7I show the relationship between the strobe signals and the four-phase pulse signals supplied to a pulse motor when driving at high and low speeds.
Figure 7C:
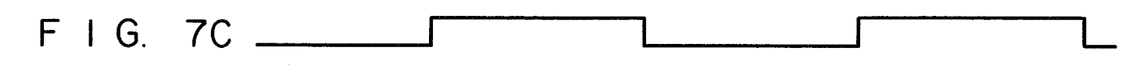
Figure 7D:
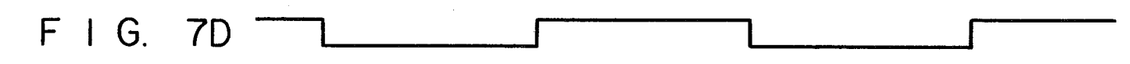
Figure 7E:
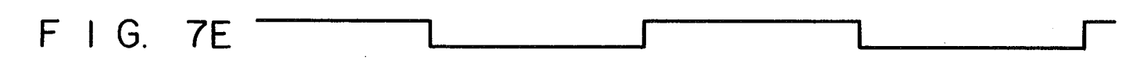
Figure 7F:
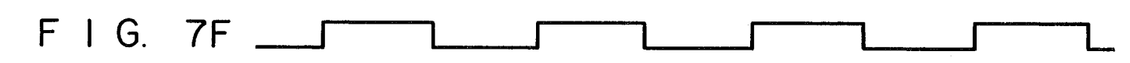
Figure 7G:
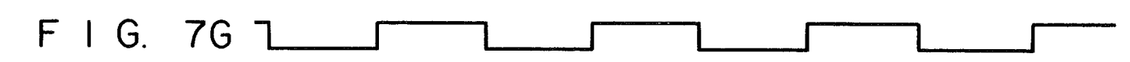
Figure 7H:
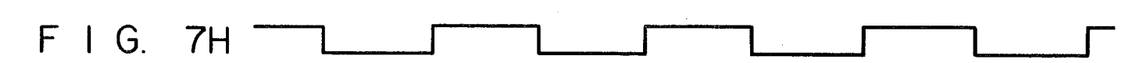
Figure 7I:
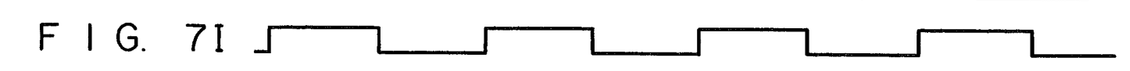

FIG. 7A shows the strobe signal and FIGS. 7B to 7E show the four-phase pulse signals to be given to this pulse motor when driving the pulse motor 18 at low speed. FIGS. 7F to 7I show the four-phase pulse signals to be given to the pulse motor 18 when driving at high speed. As will be understood from FIGS. 7A to 7I, even in the high-speed and low-speed driving operations, the period of the strobe signal is not changed. The amount of the rotation of the pulse motor 18 in the high level period $t_H$ of the strobe signal at the time of the high speed driving is twice the rotation amount at the time of the low speed driving; therefore, a width of the picture element to be printed is doubled.

Figure 8:
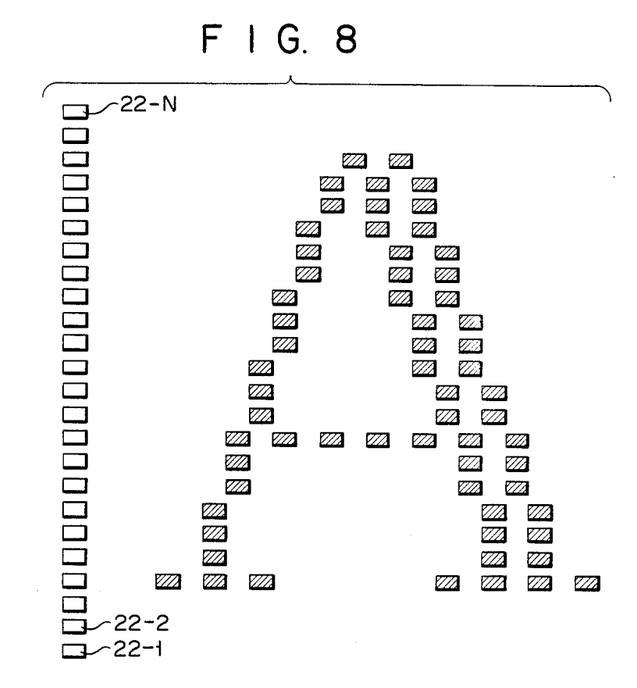
FIG. 8 shows an example of a character printed in the high density printing mode.

In this example, the printing operation is set in the high density printing mode and the pulse motor 18 is driven at the low speed V, so that each picture element of the character pattern to be printed is constituted by one dot as shown in FIG. 8.

In this way, after the dot pattern data of one column is printed, it is then checked in STEP 3 whether one character pattern data has been completely printed or not. Now, when it is detected that one or more dot pattern data of the character pattern data are not printed, the content of the address memory area is increased by "1". Thereafter, the similar operations as described formerly are executed. In other words, in this example, in STEP 4, it is detected that the printing operation has been set in the high density printing mode and the next 24-bit dot pattern data is read out from the ROM 4 on the basis of the address data of the address memory area ADM. In this way, the similar operations are repeatedly executed and as shown in FIG. 8, the character specified by the character specifying data from the host computer 8 (in this example, character A) is printed with high density. In FIG. 8, the elements which are arranged in a vertical line on the left side of character A denote the thermal resistors 22-1 to 22-N of the thermal head 22.

When it is detected in STEP 3 that one character has been completely printed, the CPU 2 writes the address data and first and second condition data in the RAM 6 in accordance with the character specifying data, height data and width data with respect to a next character to be printed from the host computer 8. In this case, if the height data and width data from the host computer 8 are the same as the former ones, it is not necessary to rewrite the first and second condition data stored in this RAM 6.

When it is detected in STEP 1 that the printing operation is not set in the high density printing mode on the basis of the first condition data stored in the memory area FCM in the RAM 6, the CPU 2 designates the head address of the corresponding character data stored in the low density character memory area LDM on the basis of the address data stored in the address memory area ADM of the RAM 6, reads out the first dot pattern data of this character data, and then stores in the buffer memory area BFM in the RAM 6. The CPU 2 then detects the number of the dots which constitute each picture element in the direction of column in STEP 5 on the basis of the first condition data stored in the memory area FCM in the RAM 6. For example, in this embodiment, it is assumed that it is possible to selectively set the number of dots in the direction of column of each picture element into 1, 2 or 3, and that the first condition data to designate the number of dots into 1, 2 and 3 are "0 1", "1 0" and "1 1", respectively. As already described, the first condition data of "0 0" represents the high density printing mode.

Figure 9A:
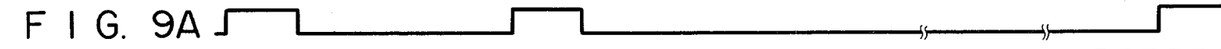
FIGS. 9A to 9D are signal waveform diagrams to illustrate the operation of the thermal printer shown in FIGS. 1 to 4 in a case where the number of dots in the direction of column of each picture element is set into 3 in the low density printing mode.
Figure 9B:
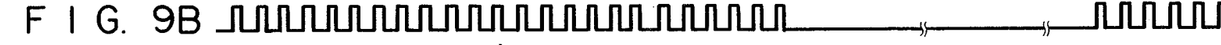
Figure 9C:
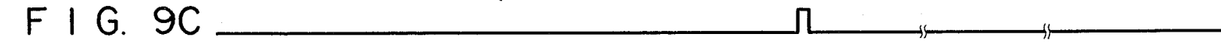
Figure 9D:
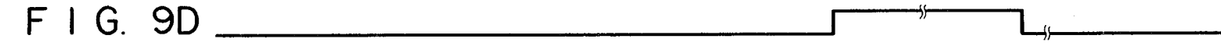
Figure 10:
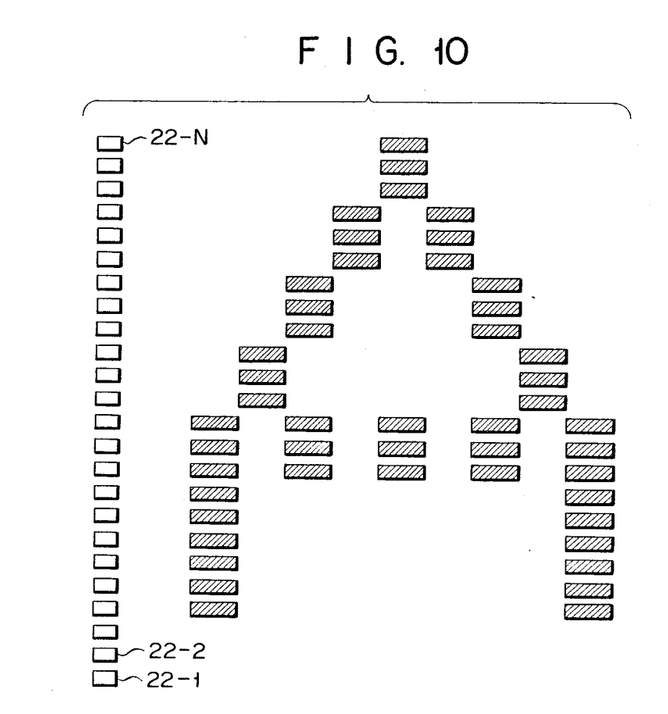
FIG. 10 shows an example of the character printed in the low density printing mode shown in FIGS. 9A to 9D.

In this STEP 5, when it is detected that the first condition data is "1 1", namely that the number of dots in the direction of column of each picture element is set into 3, the CPU 2 allows the dot pattern data to be generated bit by bit from this buffer memory area BFM as shown in FIG. 9A each time three clock pulses shown in FIG. 9B are generated. The shift register 30 receives the dot pattern data supplied from the buffer memory area BFM in response to the 24 clock pulses shown in FIG. 9B and sequentially shifts them. In this case, since the three clock pulses are supplied to the shift register 30 in each bit period of the 8-bit dot pattern data from the buffer memory area BFM, each bit of this 8-bit dot pattern data is stored in each of corresponding three stages of the shift register 30. In other words, the 8-bit dot pattern data is converted into the 24-bit dot pattern data. As described above, after the 24 clock pulses were supplied to the shift register 30, the latch pulse shown in FIG. 9C is supplied to the latch circuit 32 in STEP 2, so that the 24-bit dot pattern data stored in the shift register 30 is transferred to the latch circuit 32. Thereafter the CPU 2 sets the rotating speed of the pulse motor 18 into the speed of, for example, twice (2 V) the speed in the case of the high density printing mode in accordance with the second condition data "1" in the memory area SCM in the RAM 6, and thereafter the CPU 2 supplies the strobe signal shown in FIG. 9D to the NAND gates 34-1 to 34-N in a predetermined period of time. Due to this, currents are selectively allowed to flow through the thermal resistors 22-1 to 22-N in accordance with the data stored in the latch circuit 32. Then, after the content of the address memory area ADM is increased by "1", the same operations as previously described are repeatedly executed, causing character A to be printed with low density as shown in FIG. 10. Each picture element of this character A shown in FIG. 10 is constituted by 3×2 dots.

Figure 11A:
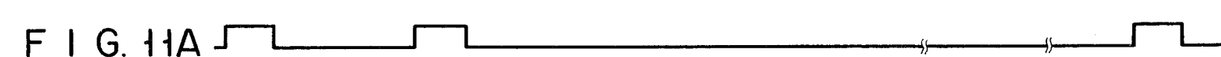
FIGS. 11A to 11D are signal waveform diagrams to illustrate the operation of the thermal printer shown in FIGS. 1 to 4 in a case where the number of dots in the direction of column of each picture element is set into 2 in the low density printing mode.
Figure 11B:
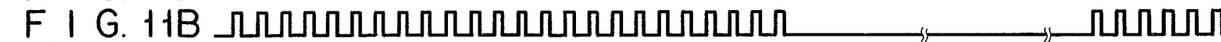
Figure 11C:
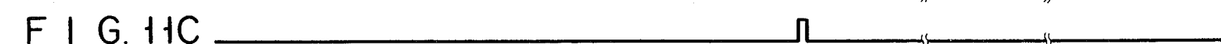
Figure 11D:
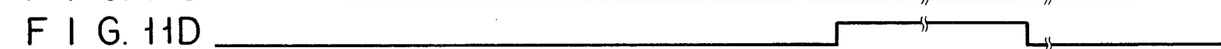
Figure 12:
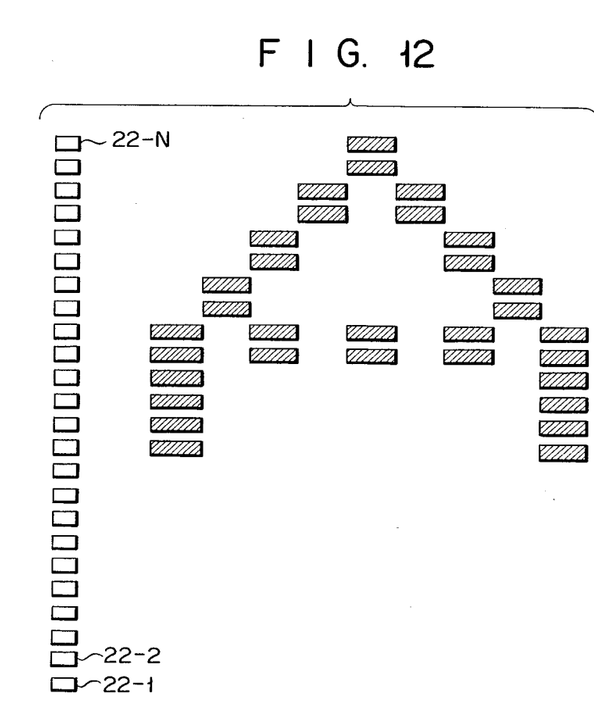
FIG. 12 shows an example of the character printed in the low density printing mode shown in FIGS. 11A to 11D.

In STEP 5, when it is detected that the first condition data is "1 0", i.e., that the number of dots in the direction of column of each picture element is set into 2, the CPU 2 allows the dot pattern data to be generated bit by bit from the buffer memory area BFM as shown in FIG. 11A each time two clock pulses shown in FIG. 11B are generated. The shift register 30 receives the dot pattern data supplied from the buffer memory area BFM in response to 24 clock pulses shown in FIG. 11B and sequentially shifts them. In this case, since two clock pulses are supplied to the shift register 30 in each bit period of the 8-bit dot pattern data from the buffer memory area BFM, each bit of this 8-bit dot pattern is stored in each of corresponding two stages of the shift register 30, and "0" is stored in the remaining eight lower stages, respectively. In other words, the 8-bit dot pattern data is converted into the 16-bit dot pattern data accompanied with the 8-bit data of "0". Thereafter, the CPU 2 generates the latch pulse and strobe signal shown in FIGS. 11C and 11D, respectively, thereby printing the dot pattern data of one column in the same manner as described above. Thereafter, the similar processing operations are executed with respect to the dot pattern data in each column, so that a character A is printed with low density as shown in FIG. 12. Each picture element of this character A shown in FIG. 12 is constituted by 2×2 dots. This character shown in FIG. 12 is reduced to ⅔ in the direction of column as compared with that shown in FIG. 10.

Figure 13A:
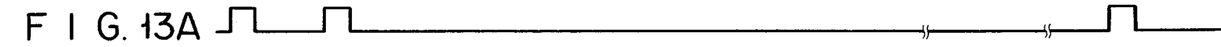
FIGS. 13A to 13D are signal waveform diagrams to illustrate the operation of the thermal printer shown in FIGS. 1 to 4 in a case where the number of dots in the direction of column of each picture element is set into 1 in the low density printing mode.
Figure 13B:
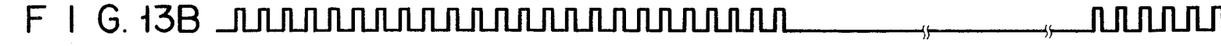
Figure 13C:
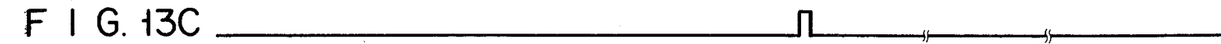
Figure 13D:
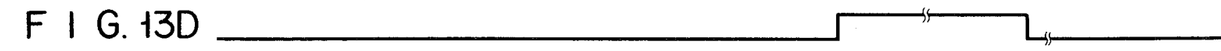
Figure 14:
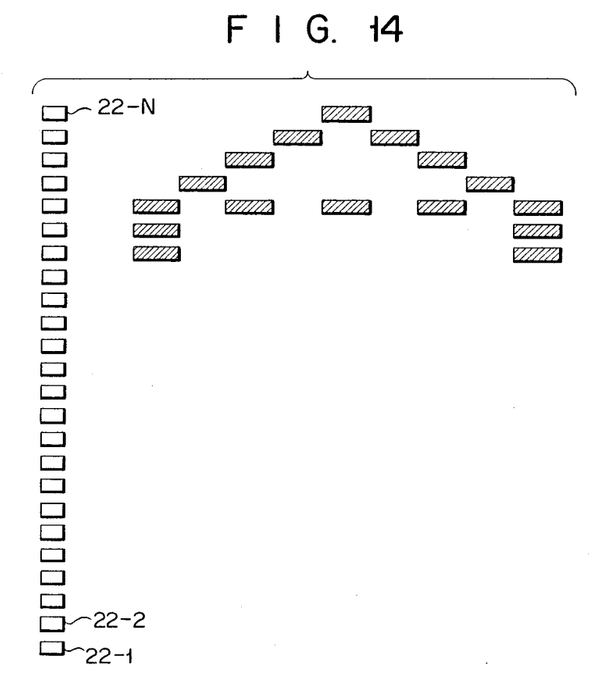
FIG. 14 shows an example of the character printed in the low density printing mode shown in FIGS. 13A to 13D.

Furthermore, in STEP 5, when it is detected that the first condition data is "0 1", i.e., that the number of dots in the direction of column of each picture element is set into 1, the CPU 2 allows the dot pattern data to be generated bit by bit as shown in FIG. 13A from the buffer memory area BFM each time one clock pulse shown in FIG. 13B is generated. The shift register 30 receives the 8-bit dot pattern data from the buffer memory area BFM in response to the 24 clock pulses shown in FIG. 13B and sequentially shifts them. In this case, the eight bits of the dot pattern data from the buffer memory area BFM are stored in the eight upper stages of the shift register 30, respectively, and "0" is stored in the remaining 16 stages, respectively. In other words, the 8-bit dot pattern data from the memory area BFM is converted into the 8-bit dot pattern data accompanied with the 16-bit data of "0" and is stored in the shift register 30. Thereafter the CPU 2 generates the latch pulse and strobe signal shown in FIGS. 13C and 13D, respectively, thereby printing the dot pattern data of one column in the manner similar to that described before. Thereafter, the similar operations are executed and a character A shown in FIG. 14 is printed with low density. Each picture element of this character A of FIG. 14 is constituted by 1×2 dots. This character of FIG. 14 is reduced to ⅓ in the direction of column as compared with that shown in FIG. 10.

Figure 15:
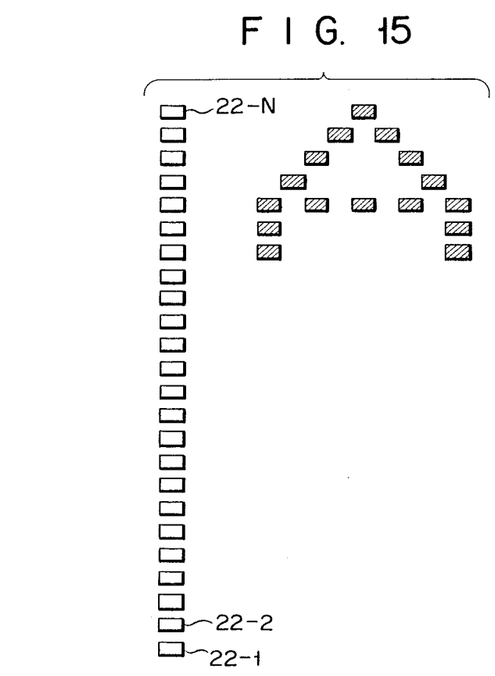
FIG. 15 shows an example of the character printed in a case where the moving speed of the carriage is reduced to ½ of the normal speed in the low density printing mode shown in FIGS. 13A to 13D.

Even in the low density print mode, it is possible to drive the pulse motor 18 at low speed V. In such a case, the same width data as that generated in the high density printing mode is generated from the host computer 8. For example, in a case where the first condition data of "0 1" is stored in the memory area DNM and the second condition data "0" representative of a picture element of a narrow width is stored in the memory are SCM, since the pulse motor 18 is rotated at the speed of V, as shown in FIG. 15, character A having a width of ½ of that shown in FIG. 14 is printed.

Although the present invention has been described in the above with respect to one embodiment, the present invention is not limited to only this embodiment. For example, although the second condition data is represented by one bit in the above embodiment, it is possible to set the rotating speed of the pulse motor 18 by three or more steps using two or more bits.

Moreover, in the above embodiment, although the memory area HDM or LDM is selected in accordance with the content of the first condition data, it is possible to allow the mode specifying data indicative of the printing operation mode to be generated from the host computer 8 and to create the address data by combining the character specifying data and the mode specifying data, thereby to designate the memory location corresponding to the ROM 4 on the basis of this address data.

What is claimed is:

1. A thermal printer comprising
    data generation means for generating character specifying data to designate a character to be printed and a size data representative of the size of the picture element of the character;
    a thermal head having a plurality of heating elements arranged in a line;
    head drive means for driving said thermal head in the printing direction at a speed determined by a drive signal;
    head control means for selectively supplying currents to said plurality of heating elements in accordance with a dot pattern data;
    memory means having a first memory area storing a plurality of character data which are each constituted by m dot pattern data each having n bits; and
    print control means for receiving the character data designated by said character specifying data from said memory means, converting the n-bit dot pattern data of the received character data into dot pattern data of the number of bits designated by said size data, supplying the converted dot pattern data to said head control means and supplying the drive signal corresponding to said size data to said head drive means.

2. A thermal printer according to claim 1, wherein said data generation means generates a density data to designate a high density printing mode and said memory means includes a second memory area storing a plurality of high density character data which are each constituted M dot pattern data each having N bits, and wherein said print control means fetches the character data corresponding to the character specifying data from said second memory area in response to said density data and supplies the N-bit dot pattern data of said character data to said head control means.

3. A thermal printer according to claim 2, wherein said head control means includes data storing means for storing the dot pattern data from said print control means, and gate circuits to selectively energize said plurality of heating elements in accordance with the dot pattern data stored in said data storing means.

4. A thermal printer according to claim 3, wherein said data storing means includes a shift register to temporarily store the dot pattern data from said print control means, and a latch circuit to latch the data stored in said shift register.

5. A thermal printer according to claim 1, wherein said head control means includes data storing means for storing the dot pattern data from said print control means, and gate circuits to selectively energize said plurality of heating elements in accordance with the dot pattern data stored in said data storing means.

6. A thermal printer according to claim 5, wherein said data storing means includes a shift register to temporarily store the dot pattern data from said print control means, and a latch circuit to latch the data stored in said shift register.

7. A thermal printer comprising:
    data generation means for generating a character specifying data to designate a character to be printed and a density data representative of the print density of said character;
    a thermal head having a plurality of heating elements arranged in a line;
    head drive means for driving said thermal head in the printing direction at a speed determined by a drive signal;
    head control means for selectively supplying energization currents to said plurality of heating elements in accordance with dot pattern data;
    memory means having a first memory area storing a plurality of low density character data which are each constituted by m dot pattern data each having n bits, and a second memory area storing a plurality of high density character data which are each constituted by M dot pattern data each having N bits; and
    print control means for receiving character data designated by said character specifying data from one of said first and second memory areas selected by said density data and supplying the received character data to said head control means, and producing a drive signal corresponding to said density data to said head drive means.

8. A thermal printer according to claim 7, wherein said head control means includes data storing means for storing the dot pattern data from said print control means, and gate circuits to selectively energize said plurality of heating elements in accordance with the dot pattern data stored in said data storing means.

9. A thermal printer according to claim 8, wherein said data storing means includes a shift register to temporarily store the dot pattern data from said print control means, and a latch circuit to latch the data stored in said shift register.

10. A thermal printing method for a printer having a high density printing mode, comprising the steps of:

generating a character specifying data to designate a character to be printed and a size data representative of the size of the picture element of the character;

fetching a character data in accordance with the character specifying data, said character data being constituted by m dot pattern data each having n bits;

converting the n-bit dot pattern data of said fetched character data into the dot pattern data of the number of bits to be determined by said size data;

allowing energization currents to flow through a plurality of heating elements of a thermal head in a predetermined period of time in accordance with said converted dot pattern data;

driving said thermal head in the printing direction at a speed determined by said size data;

generating a high density data indicative of the high density printing mode; and fetching the character data which is constituted by m dot pattern data each having n bits in place of the character data which is constituted by said n bits ×m dot pattern data on the basis of said character specifying data when said high density data is generated.

* * * * *